United States Patent Office 3,392,148
Patented July 9, 1968

3,392,148
ALDEHYDE TERMINATED URETHANES
John D. Zech, Wilmington, Del., and Robert H. Hunter, Mendenhall, Pa., assignors to Atlas Chemical Industries, Inc., Wilmington, Del., a corporation of Delaware
No Drawing. Filed Dec. 21, 1964, Ser. No. 420,201
7 Claims. (Cl. 260—67)

ABSTRACT OF THE DISCLOSURE

Polyurethane compositions containing terminal aldehyde groups are produced by reacting monomeric hydroxy-aldehydes with polyisocyanates in proportions to furnish substantially one hydroxyl equivalent of the hydroxy-aldehyde per isocyanate equivalent of the polyisocyanate. The polyisocyanate may be any of the di- or tri-isocyanates ordinarily used in the production of polyurethane resins or an isocyanate terminated prepolymer containing at least two isocyanate groups, obtained by reacting a stoichiometric excess of a polyisocyanate with a di- or polyhydric alcohol. The products of the invention are useful as cross linking agents for resins containing aldehyde-reactive groups and are self-polymerizable to useful resins.

---

The invention relates to novel polyurethane compositions and, more particularly, to polyurethane products possessing terminal aldehyde groups and methods for their production. It is known that polyurethane resins may be prepared by reacting polyisocyanates with hydroxy compounds possessing at least two hydroxyl groups per molecule. It is also known to prepare suh resins containing an excess of isocyanate groups and to cure them by incorporating materials such as water or amines which react with unreacted isocyanate groups, or to incorporate catalysts which causes trimerization of isocyanates.

One of the objects of this invention is to produce novel polyurethane compositions which contain terminal aldehyde groups.

A further object of this invention is to provide a method for the conversion of aldehyde terminated polyurethanes into infusible, insoluble plastics.

The above and other objects will become apparent from the following description of the invention.

This invention provides a novel class of products comprising aldehyde terminated polyurethane compositions which are stable on storage and which can be cured to infusible, insoluble resins by heating in the presence of an acid catalyst.

The cured resins of this invention can be used as protective coatings, moldings and adhesives for laminates and the like. They are resistant to many chemicals and solvents and can be produced with a wide range of physical properties. The aldehydric urethanes of the invention can also be used to modify other resins such as phenol-formaldehyde resins, urea formaldehyde resins, melamine-formaldehyde resins, furan resins, polyamides and the like.

The novel compositions of this invention may be prepared by the addition reaction of hydroxy-aldehydes with polyisocyanates.

Among the preferred polyisocyanates to be employed are linear polyurethane prepolymers containing unreacted terminal isocyanate groups. Such linear prepolymers are prepared in known manner by reacting a polyhydroxyl compound such as a glycol with a diisocyanate using a stoichiometric excess of the latter. The excess or unreacted isocyanate groups of the formed polyurethane prepolymer are then reacted with the hydroxyl groups of a hydroxy-aldehyde. This results in the formation of a polyurethane prepolymer which possesses terminal aldehyde groups.

These novel prepolymers can be represented by the formula:

(I) 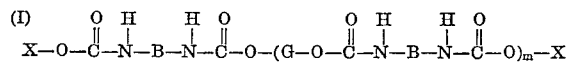

wherein X is selected from the group consisting of

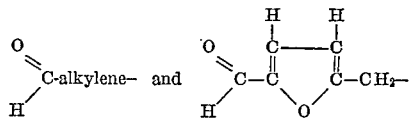

B is the divalent radical of a diisocyanate remaining after removal of the isocyanate groups therefrom and G is the divalent radical of a dihydric alcohol remaining after removal of the hydroxyl groups therefrom and $m$ is at least 2.

Other compositions of this invention are monomeric in structure and comprise the addition products of a polyisocyanate and an hydroxy-aldehyde prepared by directly reacting the isocyanate groups of a polyisocyanate compound with the hydroxyl groups of an hydroxy-aldehyde in stoichiometric proportions. This type of novel monomeric product can be characterized by the formula:

(II)

$$A-(N-C-O-X)_n$$
       H  O
       |  || wherein A is a the polyvalent radical of a polyisocyanate remaining after removal of $n$ isocyanate groups therefrom, $n$ is an integer from 2–3, and X has the significance previously defined.

Additional novel monomeric compositions can be prepared by reacting a monomeric aliphatic polyhydric alcohol with sufficient diisocyanate to produce free isocyanate groups at all hydroxyl positions. The unreacted isocyanate groups can then be reacted with the hydroxyl groups of an hydroxy-aldehyde, resulting in the formation of a monomeric urethane composition possessing aldehyde groups. This type of monomeric product can be represented by the formula:

(III) 

wherein P is a the hydroxyl-free radical of a monomeric polyhydric alcohol remaining after removal of $y$ hydroxyl groups therefrom, $y$ is an integer from 2–6, and B and X have the significance defined hereinbefore.

It will be understood by those skilled in this art that the products corresponding to Formulas I and III may also be prepared by reacting a hydroxy-aldehyde with less than all of the isocyanate groups of a polyisocyanate, and condensing the resulting product with a polyhydric alcohol or an hydroxyl terminated polyurethane prepolymer.

The reaction products of this invention are useful as crosslinking agents. In particular, these compositions have been found to be of value in crosslinking resins such as urea formaldehyde resins, phenol formaldehyde resins, furan resins, melamine formaldehyde resins and the like; however, they may also be polymerized.

It has been found that the novel aldehyde terminated polyurethane compositions of this invention can be cured with the aid of an acid catalyst or with a material which will liberate an acid on heating. On application of heat, up to about 100–200° C. in presence of such catalyst, the subject compositions can be converted into infusible, insoluble plastics.

As a result of this conversion reaction in the presence of an acidic catalyst films of polyurethane plastics may be prepared from solutions of the subject material. Moldings and laminates can also be prepared from the powdered solid prepolymer through this conversion reaction.

The isocyanates that may be used to produce the subject compounds may be suitably any of the polyisocyanates which are generally used in the preparation of the polyurethane polymers. Among such are tetramethylene diisocyanate, pentamethylene diisocyanate, hexamethylene diisocyanate, 2,4 tolylene diisocyanate, 2,6 tolylene-diisocyanate, dicyclohexylmethane diisocyanate, 3-methyldiphenylemethane-4:4′-diisocyanate, p-phenylene diisocyanate, m-phenylene diisocyanate, 4-chloro-1,3-phenylene diisocyanate, methylene-bis-(p-phenyl-isocyanate), 2:4:4′-triisocyanatodiphenyl ether and 2:4:6-triisocyanatotoluene.

Furthermore, mixtures of polyisocyanates may be utilized to produce the subject polymers.

A number of polyhydroxy compounds can be suitably used in the reaction to form the desired products of this invention. Among the suitable polyhydric products are ethylene glycol, propylene glycol, sorbitol, diethylene glycol, polypropylene glycol, mannitol, hexylene glycol, glycerin, dipropylene glycol, polyethylene glycol, triethylene glycol, 1,5-pentane diol, 1,4-butanediol and 2,2-di(beta hydroxyethoxyphenyl) propane and oxyalkylene addition products of any of the above. It is also possible to use mixtures of polyhydroxy compounds in order to achieve desired properties.

The physical properties of appropriate final products can be controlled by variation of ingredients which are used to product the prepolymer. For example, the properties of the finished plastic may be varied by changing the ratio of isocyanate to hydroxyl groups which in effect controls the molecular weight of the prepolymer. Further, the flexibility of the final product can be modified by utilizing long chain or short chain aliphatic polyhydroxy compounds. Additionally, other variations can be achieved by incorporating small amounts of higher functional materials such as polyhydric alcohols, polyamines and aminoalcohols. However, modifications of this last named type must be kept to a minimum in the species of this invention involving the linear prepolymer reactant mixture consisting of diisocyanate-glycol-hydroxy-aldehyde to avoid excessive crosslinking. Further variations of the subject compoistions can be prepared by incorporating small amounts of poly-functional isocyanates such as triisocyanates into the reaction mixture.

In the preparation of the novel aldehyde terminated polyurethane compositions it is normally desirable to react the ingredients in a non-reactive diluent. Various diluents such as hydrocarbons, esters, ethers and ketones may be suitably used depending on the solubility characteristics of the reactants. Among the diluents that have been utilized are hexane, methyl isobutyl ketone, dioxane, butyl acetate, diisobutyl ketone, butyl ether, heptane, methyl amyl acetate and toluene.

In the preparation of the linear prepolymers, the glycol and isocyanate reactants may, for example, be incorporated with a quantity of dioxane approximately equal to or slightly more than the combined weight of glycol and isocyanate materials. Various molar ratios of polyisocyanate to polyhydroxy compound can be used so long as the polyisocyanate component is in excess. For example, a ratio of 5:4 has been found satisfactory with several glycol-diisocyanate pairs. A trace of a catalyst may be added to accelerate the reaction between the polyisocyanate and polyhydroxy compounds. Any catalyst commonly used in making polyurethanes may be used. It is well known that tertiary amines and various tin compounds are useful for this purpose. Among the suitable catalysts we have found triethylene diamine to be quite satisfactory. This mixture may then be heated, for example, under a dry nitrogen atmosphere, at 70–75° C. to complete the urethane reaction. A suitable hydroxy-aldehyde is then added to the reactant mixture and the reaction is continued until the isocyanate content of the reaction mixture is essentially zero. The aldehyde terminated polyurethane product is then recovered from the reaction mixture by any suitable means such as evaporation of solvent or precipitating by water or other appropriate non-solvents. The product may then be washed if necessary to remove impurities and dried.

In the preparation of monomeric polyisocyanate-hydroxy-aldehyde reaction products, the polyisocyanate is reacted directly with one mol of an hydroxy-aldehyde for each isocyanate radical under dry nitrogen atmosphere at 70–75° C. to form a corresponding monomeric polyaldehyde. A trace of catalyst of the type used in the preparation of the above linear prepolymers may be used to accelerate this reaction.

In the preparation of monomeric aliphatic polyhydric alcohol-diisocyanate-hydroxy-aldehyde reaction products the polyhydric alcohol is first treated with at least one mol of diisocyanate for each hydroxyl group. Unreacted diisocyanate may be removed by vacuum distillation. The resulting product is then reacted with one mol of an hydroxy-aldehyde for each remaining isocyanate radical. The reaction canditions employed and the catalyst that may be used are the same as described above in relation to the linear prepolymers.

In regards to ratio of ingredients, it is desirable in the final reaction stage in the formation of the novel compositions of this invention to have substantially equivalent amounts of hydroxyl from the hydroxy-aldehyde and isocyanate groups present.

Many various hydroxy-aldehydes can be utilized as the source of the aldehyde radicals which are positioned on the ends of the polyurethane chain according to this invention. An illustrative list of such hydroxy-aldehydes includes hydroxymethylfurfural, 5-hydroxy pentanal, acetaldol, 2,5 dimethyl-2-hydroxy adipaldehyde, 3(β-hydroxyethoxy) propanal, and β-hydroxyethoxyacetaldehyde.

According to this invention, these aldehyde terminated urethane prepolymers can be readily crosslinked by heating in the presence of an acid catalyst or compounds which liberate acid on heating. Suitably the subject compositions are heated to a temperature of about 140 to 190° C. for 30 to 90 minutes to accomplish the desired crosslinking. A great number of acidic materials can be used for this purpose. Generally it is necessary to use from about 0.1% to about 5% of the catalyst on the weight of the aldehyde-terminated urethane prepolymer to accomplish the desired crosslinking. Among the many satisfactory catalysts are p-toluene sulfonic acid, benzoic acid and their salts. Additionally, boron trifluoride-amine complexes can also be used for this purpose.

The following examples will serve to more clearly illustrate the nature of the present invention; however, the invention is not intended to be limited to these examples.

Example 1

About 160 gm. (0.4 mol) polypropylene glycol, 125 gm. (0.5 mol) methylene bis (p-phenyl isocyanate) and a trace of triethylene diamine were incorporated with 300 gm. of dioxane in a reaction vessel. This mixture was heated for about two hours at 70–75° C. under a dry nitrogen atmosphere. After this period 25.2 gm. (0.2 mol) of hydroxymethylfurfural was added to the above mixture and the reaction was continued at 70–75° C. for approximately another two hour period. At the end of this period 500 ml. of water was added to the reaction mixture under high speed agitation to precipitate the polyurethane composition. The supernatant liquid was decanted off and the washing repeated four times with 500 ml. of water each time. Finally the solid matter was filtered off and vacuum dried at 60–70° C. The product consisted of a fine, granular buff colored solid.

Example 2

The process of Example 1 was repeated with tetrahydrofurandicarbinol being used as the glycol component and 2,4 tolylene diisocyanate as the isocyanate component. Hydroxymethylfurfural was used as the hydroxyaldehyde component. The mol ratios between the diisocyanate, glycol and hydroxy-aldehyde components was 5:4:2 respectively as in Example 1. A fine, granular, yellow colored product was obtained.

Example 3

The process of Example 1 was repeated using the 2,2-di(beta hydroxyethoxyphenyl) propane as the glycol component, hydroxymethylfurfural as the hydroxy-aldehyde and tolylene diisocyanate as the isocyanate component. The mol ratios between the components was the same as in Examples 1 and 2. A granular straw colored product was obtained.

Example 4

The process of Example 1 was repeated using methylene bis (p-phenyl isocyanate) as the isocyanate component, diethylene glycol as the glycol component and hydroxymethylfurfural as the aldehyde component in mol ratios of 5:4:2 respectively. A fine granular buff colored product was obtained.

Example 5

The process of Example 1 was repeated using methylene bis (p-phenyl isocyanate) as the isocyanate component, diethylene glycol as the glycol component and 5-hydroxy pentanal as the hydroxy-aldehyde component in mol ratios of 5:4:2 respectively. A fine granular buff colored product was obtained.

Example 6

Two molar proportions of hydroxymethylfurfural and one molar proportion of 2,4 tolylene diisocyanate were placed in a reaction vessel containing an equal weight of dioxane and a trace of triethylene diamine. This mixture was heated for two hours at 70–75° C. under a dry nitrogen atmosphere. At the end of this period the reaction product was washed with water several times and dried. The resulting material was a waxy solid material.

Example 7

About 1 mol of glycerin and 6 mols of tolylene diisocyanate are placed in a reaction vessel containing an equal weight of dioxane and a trace of triethylene diamine. This mixture is heated for two hours at 70–75° C. under a dry nitrogen atmosphere. Unreacted diisocyanate is removed by vacuum distillation. Then 3 mols of hydroxymethylfurfural is added to the above mixture and the reaction is continued at 70–75° C. for approximately another two hour period until the reaction is complete.

When the excess tolylene diisocyanate is not removed by vacuum distillation and 6 mols of hydroxymethylfurfural is added instead of 3 mols, a mixture of subject monomeric products is obtained.

Example 8

A sufficient quantity of the product of Example 1 was dissolved in dimethylformamide to prepare a 35% w./v. solution. To this solution was added 1% p-toluene sulfonic acid on the weight of the polymer. To prepare a dry film of this material a small amount of this mixture was placed on a glass plate and through the use of an appropriate doctor blade the material was spread over the plate to produce a film with a wet thickness of approximately 0.010 inch. The resulting wet film was preheated at 60° C. for three hours to eliminate the solvent and then baked for one hour at 160° C. to cure the composition. The resulting film was very hard. Water, 5% NaOH and 10% $H_2SO_4$ had no solvency effect upon the cured film in 24 hour immersion tests. Dimethylformamide slightly softened the resulting film in a 24 hour immersion test. Under the same conditions dimethylsulfoxide and dioxane had no effect upon the film. The cured film was infusible at 300° C.

Example 9

A sufficient quantity of the product of Example 2 was dissolved in dioxane to prepare a 50% w./v. solution. 1% p-toluene sulfonic acid on the weight of the polymer was incorporated. A dry film was prepared by the process used in Example 8. A very hard and brittle film was obtained. Water, 5% NaOH and 10% $H_2SO_4$ had no solvency effect upon the cured film in 24 hour immersion tests. Dimethylformamide, dioxane and dimethyl sulfoxide had no solvency effect upon the dried film. The cured film was infusible at 300° C.

Example 10

A sufficient quantity of the product of Example 3 was dissolved in dimethylformamide to prepare a 50% w./v. solution. 1% p-toluene sulfonic acid on the weight of the polymer was incorporated. A dry film was prepared by the process used in Example 8. A very hard or tough film was obtained. Water, 5% NaOH and 10% $H_2SO_4$ had no solvency effect upon the cured film in 24 hour immersion tests. Dimethylformamide, dioxane and dimethyl sulfoxide had no solvency effect upon the dried film. The cured film was infusible at 300° C.

Example 11

A sufficient quantity of the product of Example 4 was dissolved in dimethylformamide to prepare a 35% w./v. solution. 1% p-toluene sulfonic acid on the weight of the polymer was incorporated. A dry film was prepared by the process used in Example 8. A very hard and brittle dry film was obtained. Water, 5% NaOH, and 10% $H_2SO_4$ had no solvency effect upon the cured film in 24 hour immersion tests. Dimethylformamide, dioxane and dimethylsulfoxide had no solvency effect upon the dried film. The cured film was infusible at 300° C.

We claim:

1. A curable polyurethane containing a plurality of terminal aldehyde groups conforming to a formula selected from the group consisting of:

(1)
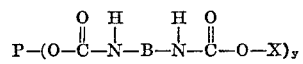

wherein P is the hydroxyl-free radical of a monomeric polyol remaining after removal of $y$ hydroxyl groups therefrom; $y$ is an integer from 2 to 6; B is the divalent radical of a monomeric organic diisocyanate remaining after removal of the isocyanate groups therefrom; and X is selected from the group consisting of:

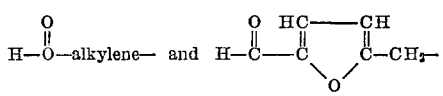

and (2)
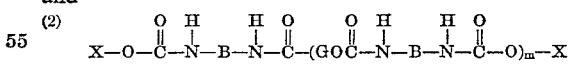

wherein G is the hydroxyl-free radical of a dihydric alcohol remaining after removal of the hydroxyl groups therefrom; $m$ is at least 2; and B and X are as defined in (1) above.

2. The process of curing a composition of claim 1 by adding a catalytic amount of acid thereto and heating at a temperature up to 200° C.

3. The product produced by the process of claim 2.

4. A process for producing a curable aldehyde terminated polyurethane of claim 1 which comprises reacting at a temperature of up to 70° C. (1) a monomeric hydroxyaldehyde with (2) a polyurethane possessing a plurality of isocyanate groups; the ratio of hydroxy aldehyde to polyurethane being such that the hydroxyaldehyde furnishes one hydroxyl group for each free isocyanate group present on said polyurethane.

5. The process of claim 4 wherein the hydroxy-aldehyde is selected from the group consisting of hydroxymethylfurfural, 5-hydroxy pentanal, acetaldol, 2,5 dimethyl-2-hydroxy adipaldehyde, 3-(β-hydroxyethoxy)propanal, and β-hydroxyethoxyacetaldehyde.

6. The process of claim 4 wherein the polyurethane is a linear isocyanate-terminated polyurethane prepolymer.

7. The process of claim 4 wherein the polyurethane is the addition reaction product of a monomeric polyol with one molar proportion of an organic diisocyanate for each hydroxyl of said polyol.

References Cited

UNITED STATES PATENTS

| | | | |
|---|---|---|---|
| 3,055,871 | 9/1962 | Heffler et al. | 260—77.5 |
| 3,226,276 | 12/1965 | Rye et al. | 156—335 |
| 3,277,098 | 10/1966 | Merten | 260—287 |
| 3,297,643 | 1/1967 | Gagliani | 260—67 |

FOREIGN PATENTS

| | | |
|---|---|---|
| 798,209 | 7/1958 | Great Britain. |
| 1,044,405 | 11/1958 | Germany. |

OTHER REFERENCES

Kraft: "The Preparation of Indanone Derivatives by a Carbamate-Aldehyde Reaction," J.A.C.S., volume 70, pp. 3569–3571 (November 1948).

DONALD E. CZAJA, *Primary Examiner.*

F. McKELVEY, *Assistant Examiner.*